United States Patent Office 3,198,699
Patented Aug. 3, 1965

3,198,699
METHOD OF COMBATTING NEMATODES WITH FORMALDEHYDE-N-METHYL DITHIOCARBAMIC ACID SALT CONDENSATION PRODUCT
Krijn van den Boogaart, Vlaardingen, Netherlands, assignor to Fabriek van Chemische Producten Vondelingenplaat N.V., a corporation of the Netherlands
No Drawing. Filed June 20, 1962, Ser. No. 203,726
Claims priority, application Netherlands, Apr. 11, 1960, 250,399
10 Claims. (Cl. 167—22)

The present application is a continuation-in-part application of my copending application, Serial No. 30,751, filed May 23, 1960, now abandoned.

The invention relates to novel compositions for combatting nematodes comprising the product formed by the condensation of 1.5 to 3 moles of formaldehyde with one mole of a dithiocarbamate having the formula $$CH_3-NH-\overset{S}{\underset{\|}{C}}-SM$$

wherein M is selected from the group consisting of an alkali metal and $-NH_4$. The invention also relates to a novel method of combatting nematodes and to a novel method of sterilizing soil.

Products formed by the condensation of formaldehyde with ammonium dithiocarbamates having the formula $$R-NH-\overset{S}{\underset{\|}{C}}-S-NH_4$$

wherein R is selected from the group consisting of hydrogen, alkyl, acyl, tolyl, nitrophenyl, chlorophenyl, naphthyl, methoxyphenyl and cyclohexyl radicals in a molar ratio of 1:1 to 6:1 have been described as insecticides and fungicides but not nematocides.

Thiadiazines having the formula $$\begin{array}{c} S \\ H_2C \diagup \diagdown C=S \\ | \quad\quad | \\ R_1-N \quad N=R_1 \\ \diagdown \diagup \\ CH_2 \end{array}$$

wherein $R_1$ is methyl or ethyl have been prepared by the condensation of 2 moles of formaldehyde with 1 mole of the corresponding lower alkyl ammonium N-alkyldithiocarbamate. While the said thiadiazines are known to possess nematocidal activity, their nematocidal activity is slow and depends upon a high soil temperature which limits their use to hot weather.

Dithiocarbamates having the fromula $$R_2-NH-\overset{S}{\underset{\|}{C}}-S-M$$

wherein $R_2$ is a methyl or ethyl radical and M is an alkali metal, alkaline earth metal or an ammonium radical are sold commercially in concentrated aqueous solutions to sterilize soil. The said dithiocarbamates are obtained in the solid form only by difficult and expensive methods and are not stable in the solid form. Nematocides in the solid form are more desirable than in the liquid form since they are easily applied while ploughing or fraising.

Compounds having the formula $$\begin{array}{c} R' \quad S \quad\quad S \quad R'' \\ \diagdown \underset{\|}{\phantom{x}} \quad\quad \underset{\|}{\phantom{x}} \diagup \\ N-C-S-S-C-N \\ \diagup \quad\quad\quad\quad\quad \diagdown \\ H \quad\quad\quad\quad\quad\quad R''' \end{array}$$

wherein R', R'' and R''' are selected from the group consisting of hydrogen, alkyl, aryl or arylalkyl radicals are known as nematocides. However, the said compounds are not stable and upon storage irritate the skin and mucosae.

It is an object of the invention to provide novel highly effective compositions for combatting nematodes which are stable and are effective over a wide range of temperatures.

It is another object of the invention to provide a novel method of combatting nematodes.

It is a further object of the invention to provide a novel method of sterilizing soil.

These and other objects and advantages of the invention will become obvious from the following detailed description.

The nematocidal compositions of the invention are comprised of the condensation product of 1.5 to 3 moles of formaldehyde with 1 mole of a salt of N-methyl dithiocarbamic acid selected from the group consisting of an alkali metal salt and ammonium salt and a solid inert carrier. The exact structure of the condensation product has not been ascertained yet, but the condensation product is definitely not a heterocyclic six membered ring of the thiadiazine type because the mole ratio of nitrogen to sulfur is about 1:1.5 rather than 1:1 as in thiadiazines. The novel compositions usually contain 10 to 90% by weight of the said condensation product.

The inert carrier will depend upon the type of composition desired. A spraying powder can be obtained by mixing the said condensation product with the usual dispersing and emulsifying agents. A strewing powder may be made by mixing the said condensation product with a carrier such as marl, chalk, talcum, fuller's earth, fertilizer, etc. The compositions may be in granulate form by granulating the said condensation product with a carrier or precipitating the condensation product on a granulated carrier such as attapulgite.

The salts of N-methyl dithiocarbamic acid can be formed by reacting a mixture of methylamine and an alkali metal hydroxide or ammonia with carbon disulfide in an aqueous medium. The condensation with formaldehyde is preferably effected in the presence of an inorganic ammonium salt such as ammonium chloride. The melting point of the products obtained by using the sodium or ammonium salts of N-methyl dithiocarbamic acid will vary between 89 and 100° C. depending upon the reaction conditions and molar proportions of the reactants. A preferred condensation product is obtained by condensing 2.5 to 3 moles of formaldehyde with 1 mole of sodium N-methyl dithiocarbamate in the presence of about 1.5 moles of ammonium chloride.

The novel method of the invention for combatting nematodes comprises contacting the nematodes with a condensation product of 1.5 to 3 moles of formaldehyde and 1 mole of an alkali metal salt or ammonium salt of N-methyl dithiocarbamic acid.

The novel method of sterilizing soil according to the invention comprises applying to the soil an effective amount of a condensation product of 1.5 to 3 moles of formaldehyde and 1 mole of an alkali metal salt or ammonium salt of N-methyl dithiocarbamic acid. The time between application and planting crops in the soil to obtain sterilization will vary depending upon the concentrations used, weather conditions, etc. but is usually only a number of days.

The nematocidal compositions of the invention are effective over a wide range of temperatures, as low as 0 to 15° C., and may therefore be used in the early spring and late fall as well as in summer. Besides applying the compositions to the soil, they may also be applied to seed potatoes, bulbs, cuttings and other plant materials which even if they have not been attacked themselves by nematodes, may disseminate the diseases. It is also possible to disinfect package material and infected means of transport with the novel nematocidal compositions.

In the following examples there are described several preferred embodiments to illustrate the invention. However, the invention is not intended to be limited to the specific embodiments.

EXAMPLE I 500 ml. of an aqueous formaldehyde solution (concentration, 2 moles per liter) were added to 500 ml. of an aqueous ammonium N-methyl dithiocarbamate solution (concentration, 1 mole per liter) at a temperature of 0 to 5° C. A white crystalline precipitate formed and was filtered, washed and then dried at 40° C. The condensation product thus obtained had no sharp melting point but began to soften at about 50° C. indicating a possible polymer structure. The starting ammonium N-methyl dithiocarbamate solution was formed by reacting 1 mole of carbon disulfide and a mixture of 1 mole of methylamine and 1 mole of ammonia in an aqueous medium at about 30° C.

EXAMPLE II

One liter of an aqueous solution containing one mole of sodium N-methyl dithiocarbamate and one liter of an aqueous solution containing 1.5 moles of ammonium chloride and 3 moles of formaldehyde were added simultaneously to one liter of water. The resulting white crystalline precipitate was filtered, washed and dried at 40° C. The condensation product had a melting point of 95 to 97° C. The yield was 87.5% of the theoretical yield.

EXAMPLE III

To demonstrate the superior activity of the nematocidal compositions of the invention, the condensation product of Example I was compared with N,N'-dimethylthiuram disulfide of the prior art. Various concentrations in gm. per m.² of soil of the said substances were applied to soil containing tylenchidous eelworms and saprophagous eelworms and the percent of kill was determined. The results are summarized in Table I.

Table I

| Active Substance | Type of Eelworm | Percentage Killed | | | |
|---|---|---|---|---|---|
| | | 15 g. | 10 g. | 7.5 g. | 5 g. |
| Condensation Product of Example I. | Tylenchidous eelworms. | 100 | 100 | 100 | 99 |
| | Saprophagous worms. | 100 | 100 | 100 | 85 |
| N,N'-di-methylthiuram disulfide. | Tylenchiduos eelworms. | 100 | 100 | 100 | 10 |
| | Saprophagous eelworms. | 100 | 100 | 100 | 40 |

As can be seen from Table I, the products of the invention are highly effective even at low concentrations.

Various modifications of the compositions and methods of the invention may be made without departing from the spirit or scope thereof, and it is to be understood that the invention is intended to be limited only as defined in the appended claims.

I claim:

1. A method of combatting nematodes comprising contacting the nematodes with a condensation product of 1.5 to 3 moles of formaldehyde and one mole of a salt of N-methyl dithiocarbamic acid selected from the group consisting of an alkali metal salt and the ammonium salt.

2. The method of claim 1 wherein the salt of N-methyl dithiocarbamic acid is sodium N-methyl dithiocarbamate.

3. The process of claim 1 wherein the salt of N-methyl dithiocarbamic acid is ammonium N-methyl dithiocarbamate.

4. A method of controlling nematodes in soil comprising applying to the soil a condensation product of 1.5 to 3 moles of formaldehyde and one mole of a salt of N-methyl dithiocarbamic acid selected from the group consisting of an alkali metal salt and the ammonium salt.

5. The method of claim 4 wherein the salt of N-methyl dithiocarbamic acid is sodium N-methyl dithiocarbamate.

6. The method of claim 4 wherein the salt of N-methyl dithiocarbamic acid is ammonium N-methyl dithiocarbamate.

7. The method of claim 4 wherein the condensation product is applied as a powder.

8. The method of claim 4 wherein the condensation product is applied as a granulate.

9. The method of claim 4 wherein the condensation product is applied with a fertilizer.

10. A process of controlling nematodes in plant materials comprising contacting the said material with a condensation product of 1.5 to 3 moles of formaldehyde and one mole of a salt of N-methyl dithiocarbamic acid selected from the group consisting of an alkali metal salt and the ammonium salt.

References Cited by the Examiner

UNITED STATES PATENTS

| | | | |
|---|---|---|---|
| 2,177,547 | 10/39 | Jones | 260—455 |
| 2,325,720 | 8/43 | Urbschat et al. | 167—33 |
| 2,766,554 | 10/56 | Dorman et al. | 167—22 |
| 2,895,980 | 7/59 | Harman et al. | 167—22 |
| 2,943,972 | 7/60 | Kerk | 167—33 |
| 2,945,781 | 7/60 | Santmyer | 167—13 |
| 3,137,615 | 6/64 | Ichikawa et al. | 167—13 |

FOREIGN PATENTS 541,048 11/41 Great Britain.

JULIAN S. LEVITT, *Primary Examiner.*

LEWIS GOTTS, *Examiner.*